US011629737B2

(12) United States Patent
Ma et al.

(10) Patent No.: US 11,629,737 B2
(45) Date of Patent: Apr. 18, 2023

(54) PROFILE CLAMP WITH A SCREW HAVING A SECTION OF REDUCED DIAMETER

(71) Applicant: NORMA Germany GmbH, Maintal (DE)

(72) Inventors: Rufei Ma, Qingdao (CN); Shiwen Wang, Changzhou (CN); Gary Ives, Newbury (GB)

(73) Assignee: NORMA Germany GmbH, Maintal (DE)

( * ) Notice: Subject to any disclaimer, the term of this patent is extended or adjusted under 35 U.S.C. 154(b) by 436 days.

(21) Appl. No.: 16/630,075

(22) PCT Filed: Jun. 21, 2018

(86) PCT No.: PCT/EP2018/066518
§ 371 (c)(1),
(2) Date: Jan. 10, 2020

(87) PCT Pub. No.: WO2019/011611
PCT Pub. Date: Jan. 17, 2019

(65) Prior Publication Data
US 2020/0355205 A1 Nov. 12, 2020

(30) Foreign Application Priority Data
Jul. 12, 2017 (CN) .......................... 201710566072.6

(51) Int. Cl.
*F16B 2/08* (2006.01)
*F16B 2/06* (2006.01)
(Continued)

(52) U.S. Cl.
CPC ............ *F16B 2/065* (2013.01); *F16B 35/041* (2013.01); *F16B 43/00* (2013.01); *F16L 23/08* (2013.01)

(58) Field of Classification Search
CPC ......... F16B 43/00; F16B 35/041; F16B 2/065
See application file for complete search history.

(56) References Cited

U.S. PATENT DOCUMENTS 774,411 A * 11/1904 Adams, Jr. ............ B60C 15/028
152/400
1,196,272 A * 8/1916 Peirce .................... H01B 17/20
248/226.12
(Continued)

FOREIGN PATENT DOCUMENTS

CN 202937588 U 5/2013
CN 203131259 U 8/2013
(Continued)

OTHER PUBLICATIONS

International Search Report for International Application No. PCT/EP2018/066518 dated Nov. 19, 2018 (11 pages).
(Continued)

*Primary Examiner* — Basil S Katcheves
(74) *Attorney, Agent, or Firm* — Reising Ethington, P.C.

(57) ABSTRACT

A profile clamp includes a clamping band and a first tensioning head arranged at a first end and a second tensioning head arranged at a second end of the clamping band. The first tensioning head includes a first opening and the second tensioning head includes a second opening. A screw is provided with a screw head and a screw body. The screw body may be guided through the first opening and the second opening. A threaded nut is provided, which may be arranged on the screw body when the screw body is guided through the first opening and the second opening. The screw body has a first threaded section and a second threaded section and a section of reduced diameter therebetween.

20 Claims, 3 Drawing Sheets

(51) Int. Cl.
*F16B 35/04* (2006.01)
*F16B 43/00* (2006.01)
*F16L 23/08* (2006.01)

(56) References Cited

U.S. PATENT DOCUMENTS

| | | | | |
|---|---|---|---|---|
| 2,060,593 A * | 11/1936 | Schaurte | ................ | F16B 31/06 411/389 |
| 2,352,372 A * | 6/1944 | Colarusso | ............... | F16L 33/04 24/286 |
| 2,724,885 A * | 11/1955 | Zartler | .................... | F16L 33/04 24/279 |
| 2,761,706 A * | 9/1956 | Risley et al. | ....... | F16L 25/0027 285/356 |
| 2,764,266 A * | 9/1956 | Haworth | ............... | F01D 25/243 415/214.1 |
| 2,828,525 A * | 4/1958 | Gail | ........................ | F16L 33/04 24/279 |
| 3,584,352 A * | 6/1971 | Turner | .................... | F16L 33/04 24/279 |
| 4,786,204 A * | 11/1988 | Mayeda | ................. | A01B 15/00 172/744 |
| 5,104,141 A * | 4/1992 | Grove | .................... | B62D 17/00 280/86.753 |
| 5,433,570 A * | 7/1995 | Koppel | ................. | E04D 3/3603 411/413 |
| 6,481,257 B1* | 11/2002 | Chartier | ................. | B21D 1/145 72/308 |
| 6,572,127 B2* | 6/2003 | Pazdirek | ................ | B60G 11/12 280/124.152 |
| 9,810,022 B1* | 11/2017 | Ayala | ........................ | E06C 7/14 |
| 10,989,246 B2* | 4/2021 | Sicard | ................... | F16B 35/005 |
| 2008/0075555 A1* | 3/2008 | March | ..................... | F16B 33/00 411/361 |
| 2012/0200083 A1* | 8/2012 | Krueger | ................ | F16B 35/041 29/525.01 |
| 2013/0108394 A1* | 5/2013 | Zhu | ........................... | F16B 7/18 411/366.1 |
| 2014/0007385 A1 | 1/2014 | Rigollet et al. | | |
| 2014/0082898 A1 | 3/2014 | Maunder | | |
| 2017/0301974 A1* | 10/2017 | Saito | ....................... | H01P 1/042 |
| 2020/0158159 A1* | 5/2020 | Sicard | ................... | F16B 35/005 |

FOREIGN PATENT DOCUMENTS

| | | |
|---|---|---|
| CN | 103429944 A | 12/2013 |
| DE | 4002450 A1 | 8/1991 |
| DE | 102015109207 A1 | 12/2016 |
| EP | 2690338 A1 | 1/2014 |
| FR | 2863335 A1 | 6/2005 |
| JP | S5672906 U | 6/1981 |
| JP | S6018324 U | 2/1985 |
| JP | 2008133943 A | 6/2008 |

OTHER PUBLICATIONS

Chinese First Office Action for Chinese Patent Application No. 201710566072.6 dated Nov. 28, 2019 (6 pages).
Japanese Office Action for Japanese Application No. 2019-500846 dated Jan. 26, 2021 (5 pages).
English Translation of Japanese Office Action for Japanese Application No. 2019-500846 dated Jan. 26, 2021 (10 pages).
Decision of Reexamination for Chinese Application No. 201710566072.6 dated Dec. 23, 2022 (9 pages).

* cited by examiner

PROFILE CLAMP WITH A SCREW HAVING A SECTION OF REDUCED DIAMETER

INTRODUCTION

The disclosure relates to a profile clamp, especially with respect to a profile clamp with a screw.

Profile clamps are typically used to secure two objects together, for instance two cylindrical pipes having flanges at their ends. Prior art clamps have featured a clamping band with two tensioning heads, a threaded screw and a corresponding threaded nut, whereby the screw is arranged through the tensioning heads and the nut may be tightened onto the screw so as to decrease the circumference of the clamping band. This has the effect that the pipes are drawn together so that a fluid tight connection is achieved.

In the particular case of a flanged connection, i.e., where a connection between two pipes with flanges on their respective ends is to be formed, it may be necessary to open the clamp to a very wide position in order to be able to fit it over the flanges and into a pre-clamping position. It therefore may be necessary to tighten the nut over essentially the entire length of a relatively long screw, which can cost some time. Whilst this issue is faced by flanged connections in particular, it also applies to forming any connection where a nut has to be tightened onto a screw. When multiplied over thousands of products, this extra tightening time can add up to many valuable production hours.

SUMMARY

It is an object of the present disclosure, per an embodiment, to provide a clamp with which the time needed to screw the nut onto the screw body to tighten the clamp is reduced.

Main features of the disclosure and embodiments are specified in detail hereafter.

In a profile clamp comprising a clamping band and a first tensioning head arranged at a first end and a second tensioning head arranged at a second end of the clamping band, wherein the first tensioning head comprises a first opening and the second tensioning head comprises a second opening, wherein a screw is provided comprising a screw head and a screw body, wherein the screw body may be guided through the first opening and the second opening, and wherein a threaded nut is provided, which may be arranged on the screw body when the screw body is guided through the first opening and the second opening, wherein the object presented above is solved according to an embodiment of the disclosure in that the screw body comprises a first threaded section and a second threaded section and a section of reduced diameter therebetween.

One purpose of the section of reduced diameter, per an embodiment, is to reduce the length that the nut must be rotated over a screw thread in order to tighten the clamp, since rotating the nut over a screw thread inherently means that the nut must be rotated a great number of times in order to be moved along the thread of the screw. Since the distance along which the nut needs to be rotated is reduced, the tightening time is also minimised, since the nut is able to slide over a length of the screw rather than be tightened all the way over the entire length of the screw thread. This is achieved, according to an embodiment, by the fact that the section of reduced diameter does not engage with the thread of the nut sufficiently, so that a user is not forced to rotate the nut in order to move it along the screw's length. A section of thread may be skipped out, as it were, by simply pushing the nut over the screw over its section of reduced diameter. Tightening via nut rotation can then be resumed once the screw reaches the further section of screw thread. Overall, the number of turns and therewith the time necessary to tighten the clamp may therefore be significantly reduced.

In an embodiment, the screw body is guided through the first opening and the second opening and the threaded nut is arranged on the screw body. This corresponds to a final state of the clamp once it has been assembled.

In an embodiment, the section of reduced diameter is longer in a longitudinal direction of the screw than one thread turn. In this way, it is possible to miss out several turns of the nut. The more turns of the nut that can be missed out, the greater the reduction in length that the nut has to be turned, and thereby the greater the reduction in tightening time.

In an embodiment, the section of reduced diameter comprises at least 20% of the length of the screw body. This enables approximately a 20% reduction in the length over which the nut must be rotated to cause tightening, thereby enabling a 20% reduction in the tightening time, assuming that the entire thread length would have been utilized if no section of reduced diameter were present. Preferably, the section of reduced diameter comprises at least 25% of the length of the screw body. More preferably, the section of reduced diameter comprises at least 30% of the length of the screw body. More preferably still, the section of reduced diameter comprises at least 40% of the length of the screw body. These can all individually constitute distinct embodiments.

In an embodiment, the section of reduced diameter has no thread. This means that no thread flanks are present on the screw body in that region that could interfere with thread flanks in the nut as the nut is slid along the section of reduced diameter.

In an embodiment, the section of reduced diameter is smooth along its length, for instance formed as a cylinder. This smoothness ensures that no projections or indentations are present that could hamper sliding the nut over the section of the reduced diameter. A cylindrical form may be preferred according to an embodiment. This means that there are also no edges or corners that could catch in the nut.

In an embodiment, the diameter of the section of reduced diameter matches and is equivalent to, or is less than, the diameter between outer flanks of the thread of the threaded nut. This enables the nut to be slid along the section of reduced diameter. The term "outer flanks" is used to describe the outermost points of the thread flanks of the nut that face towards the centre of the nut and act to form the effective inner diameter of the nut.

In an embodiment of the disclosure, the first threaded section and the second threaded section have a same outside diameter of thread. This greatly simplifies machining and ensures that the tightening action of the nut in both the first and the second threaded section occurs in a most consistent manner.

In an embodiment, the reduced diameter section corresponds to the diameter of a groove of the first threaded section or second threaded section. In this way, the diameter of the section of reduced diameter is easily defined and it is not necessary to carry out further machining of the screw in the section of reduced diameter.

In an embodiment, the first threaded section extends from a first end of the section of reduced diameter towards the screw head, and a second threaded section extends from a second end of the section of reduced diameter towards the end of the screw body. In this way, the section of reduced diameter is located in a middle of the screw body, so that a pre-assembly position is possible in which the nut is arranged at the end of the screw body interfering with the second threaded section. By rotating the nut a few turns and then squeezing the tensioning heads of the clamp towards each other and pushing the nut via the section of reduced diameter towards the first threaded section, the clamp may be taken in a short time from a preassembly position to a tightening position.

In an embodiment, the thread of the threaded nut is suitable to engage with the thread of the first and the second threaded sections of the screw body. Such a clamp embodiment is particularly easy to operate and tighten.

In an embodiment, an abutment element is provided that may be or is arranged on the screw body. Such an element may serve to prevent the nut from falling off or being screwed off the screw body, especially when the tensioning heads are biased against the nut.

In an embodiment, the abutment element is arranged in the region of an end of the screw body, against which the nut may abut in the longitudinal direction away from the screw head. This ensures that the clamp can be opened as far as possible for mounting and also that the screw and nut are held securely on the clamp in the preassembly position.

In an embodiment, the abutment element is a washer. A washer is relatively cheap to produce and simple to use and assemble.

In one embodiment, the abutment element is fixed to the screw body, which prevents it from coming detached. Preferably, in the embodiment, the abutment element is fixed via a weld joint, which is particularly strong. Other securing means are possible, for instance adhesive or a frictional connection.

In an embodiment, the first and second openings are formed in the region of the respective centres of the first and second tensioning heads. This ensures that the screw cannot slide out of the openings laterally under stress or a load.

In one embodiment, the clamping band comprises a first section and a second section joined by a joining element. This facilitates a particularly wide pivoting action of the clamp in the region of the joining element, so that the clamp can be opened wide for mounting.

In an embodiment, the clamping band is biased to an open position. In this way, a user could simply press the clamp together via the section of reduced diameter and then tighten the nut.

In one embodiment, the profile clamp is a V-profile clamp having a clamping band with a V-profiled cross-section. These may be used to fix two parts together that comprise flanges.

In an embodiment, the nut is secured against rotation in respect to the tensioning head. For example, the nut may be secured by an additional element of the clamp which prevents the nut from turning, for instance a protrusion, or a shaping that may fit around or into some part of the nut. This ensures that it is not necessary to hold the nut during tightening with a tool to prevent it from turning when tightening the clamp via the screw, for example. Preferably, in an embodiment, the screw head is arranged so that it may be tightened with a tool. For instance, it may have a hexagonal, cross-shaped or linear indentation.

Preferably, the clamp and its components are made from metal. Such a clamp is relatively strong and stiff.

It is also thinkable that the screw comprises multiple sections of reduced diameter, which correspond to, for instance, a preassembly position and an intermediate position before tightening. The screw may have two, three, four or more sections of reduced diameter.

Depending on the application, the lengths of the first and second threaded sections may be different or the same.

BRIEF DESCRIPTION OF THE FIGURES

Further features, details and advantages of the disclosure may be derived from the following description of embodiments and figures.

DETAILED DESCRIPTION

Figure 1:
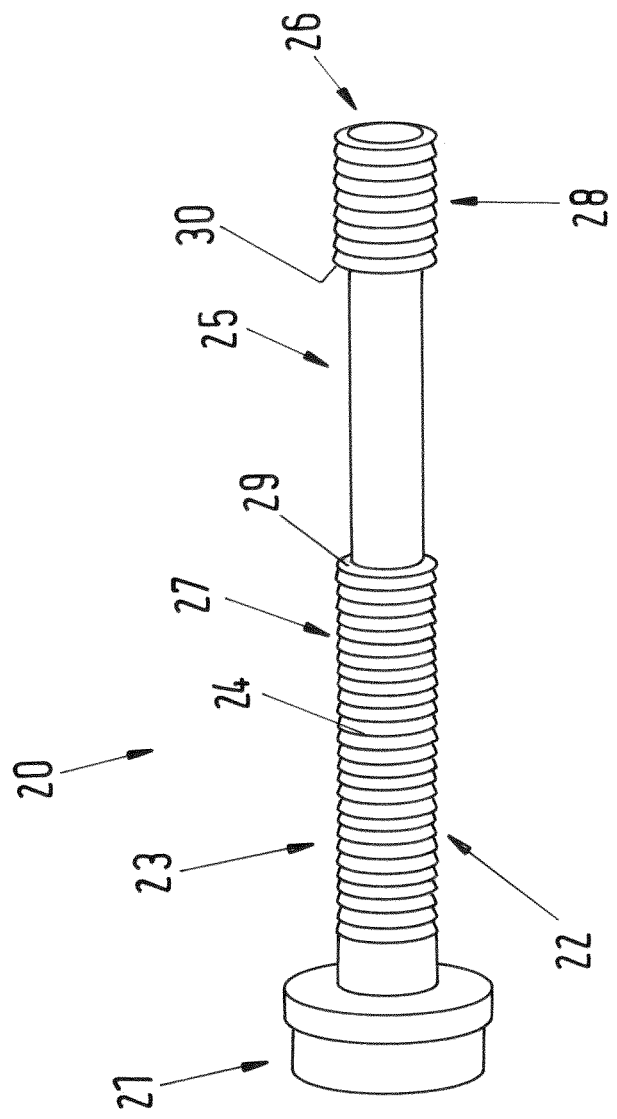
FIG. 1 shows a side view of a screw used with a profile clamp.

The screw of FIG. 1 is for use with a profile clamp and has a screw head 21 formed at one end of a screw body 22. The screw body has a thread 23 with a first threaded section 27 that extends from a first end 29 of the section of reduced diameter 25 towards the screw head 21, and a second threaded section 28 that extends from a second end 30 of the section of reduced diameter 25 towards the screw end 26. In other words, the section of reduced diameter 25 is arranged between the first threaded section 27 and the second threaded section 28. Here, the section of reduced diameter 25 is formed as a smooth cylinder with no thread 23, whereby the diameter D1 of the section of reduced diameter 25 is smaller than the outer diameter of the thread 23 in the first threaded section 27 and the second threaded section 28 of the screw body 22.

The section of reduced diameter 25 encompasses around 35% of the total length of the screw body 22, whereby other percentages are also thinkable as described herein. The thread 23 comprises thread flanks 24 that mate with a corresponding thread of a nut element (not shown).

Figure 2:
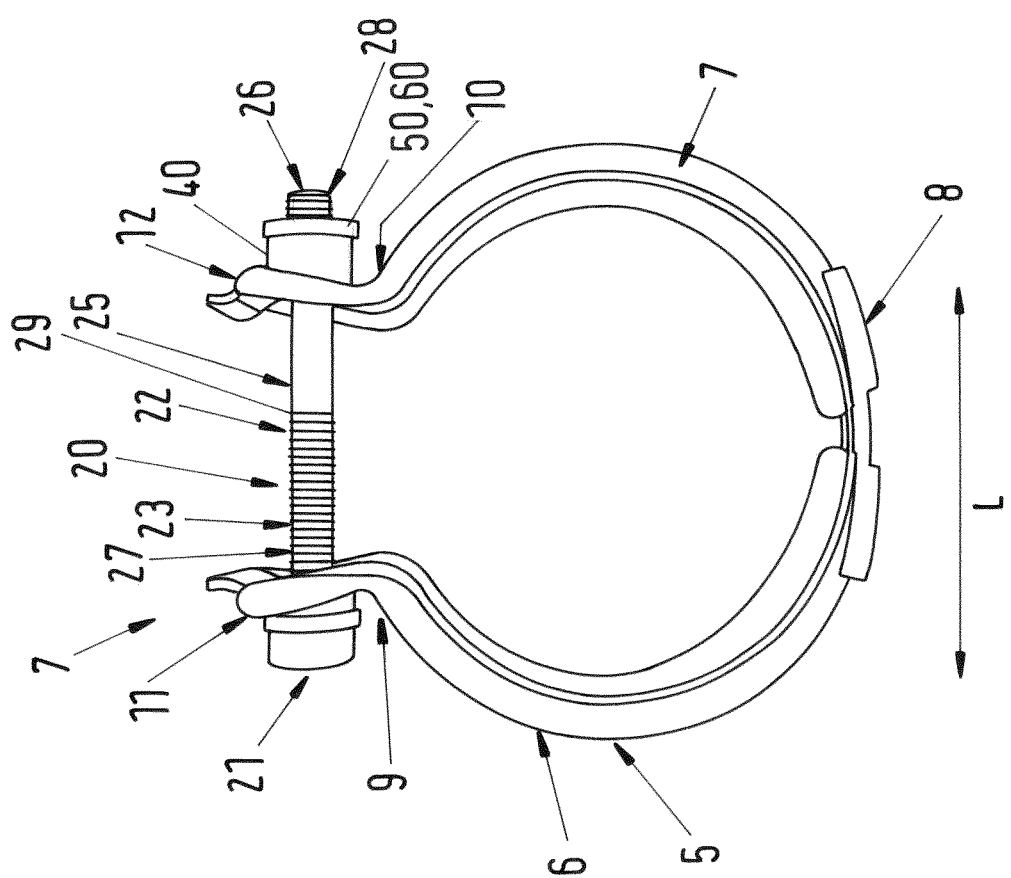
FIG. 2 shows a side view of the profile clamp.

The profile clamp 1 of FIG. 2 uses the screw 20 shown in FIG. 1. The clamp 1 has a clamping band 5 formed with a first section 6 and a second section 7 that are connected via a joining element 8. Here, the joining element 8 is formed as a band of material attached to respective ends of the first section 6 and second section 7. A first tensioning head 11 and a second tensioning head 12 are arranged at a first end 9 and second end 10 of the clamping band 5.

The screw 20 is fed through a first opening and a second opening (not shown) and secured in the openings by a nut 40, which in turn is held on the screw body 22 by an abutment element 50, which is this case is formed as a washer 60. In the state of the clamp 1 shown in FIG. 2, it is possible to press the clamp together so that the section of reduced diameter 25 of the screw body 22 slides through the nut 40 and the opening of the second tensioning head 12. Thereafter or at the same time, the nut 40 may also be moved along the section of reduced diameter 25 until it reaches the first threaded section 27 of the screw body 22, where it may be tightened again so as to prevent the clamp 1 from springing open.

Figure 3:
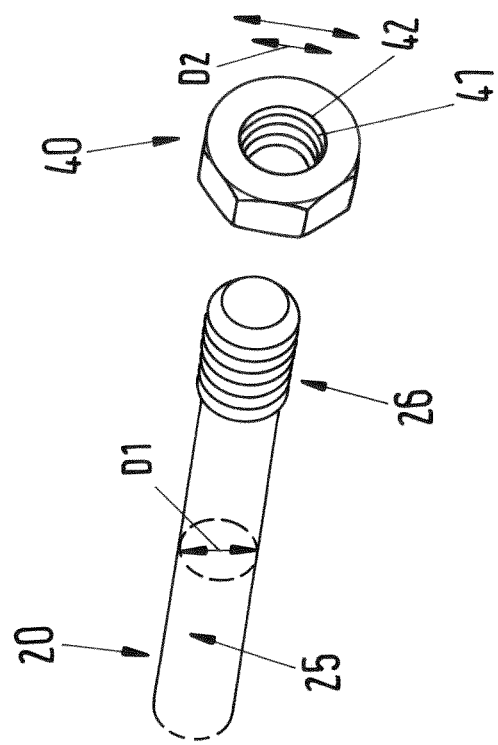
FIG. 3 shows a perspective view of an end of a screw and a washer.

FIG. 3 shows a screw end 26 of the screw 20 shown in FIG. 1 and a nut 40. Here it may be seen that a diameter D1 of the section of reduced diameter 25 matches a free diameter D2 between outer flanks 42 of the thread 41 of the nut 40, so that the nut 40 may be easily slid along the section of reduced diameter 25 of the screw 20.

Figure 4:
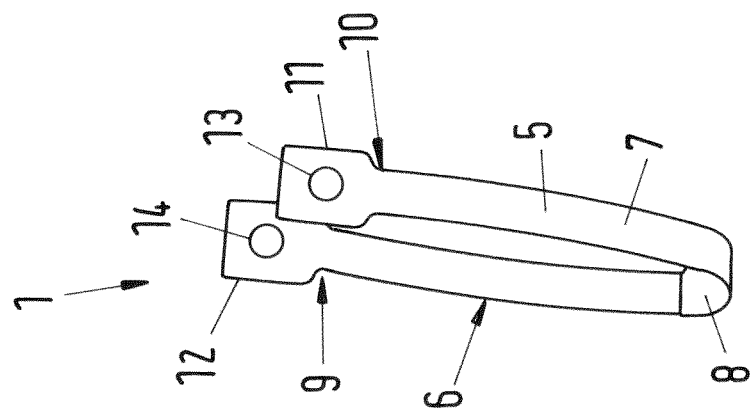
FIG. 4 shows a perspective view of the profile clamp.

FIG. 4 shows a side perspective view of the clamp 1. Here, the first opening 13 and second opening 14 through which the screw 20 is inserted may be clearly seen. They are both formed in the centre of the first tensioning head 11 and the second tensioning head 12 respectively.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCES

1 Profile clamp
5 Clamping band
6 First section
7 Second section
8 Joining element
9 First end
10 Second end
11 First tensioning head
12 Second tensioning head
13 First opening
14 Second opening
20 Screw
21 Screw head
22 Screw body
23 Thread
24 Thread flank
25 Section of reduced diameter (SRD)
26 Screw end
27 First threaded section
28 Second threaded section
29 First end of SRD
30 Second end of SRD
40 Nut
41 Thread
42 Outer flanks
50 Abutment element
60 Washer
L Longitudinal direction of screw
D1 Diameter of SRD
D2 Distance between nut flanks

The invention claimed is:

1. A profile clamp comprising a clamping band and a first tensioning head arranged at a first end and a second tensioning head arranged at a second end of the clamping band, wherein the first tensioning head comprises a first opening and the second tensioning head comprises a second opening, wherein a screw is provided comprising a screw head and a screw body, wherein the screw body is guidable through the first opening and the second opening, and wherein a threaded nut is provided, which is arrangeable on the screw body when the screw body is guided through the first opening and the second opening, wherein the screw body comprises a first threaded section and a second threaded section and comprises a section of reduced diameter therebetween, wherein the clamping band comprises a first section and a second section, wherein the first and the second section are joined by a joining element formed as a band of material attached to respective ends of the first and the second section.

2. The profile clamp of claim 1, wherein the screw body is guided through the first opening and the second opening and the threaded nut is arranged on the screw body.

3. The profile clamp of claim 2, wherein an abutment element is provided that is arrangeable on the screw body.

4. The profile clamp of claim 3, wherein the abutment element is arranged on the screw body in the region of an end of the screw body, against which the threaded nut may abut in a longitudinal direction away from the screw head.

5. The profile clamp of claim 3, wherein the abutment element is a washer.

6. The profile clamp of claim 1, wherein the section of reduced diameter is longer in a longitudinal direction of the screw than one thread turn.

7. The profile clamp of claim 1, wherein the section of reduced diameter comprises at least 20% of the length of the screw body.

8. The profile clamp of claim 1, wherein the section of reduced diameter has no thread.

9. The profile clamp of claim 1, wherein the section of reduced diameter is smooth along its length.

10. The profile clamp of claim 1, wherein a diameter (D1) of the section of reduced diameter matches or is less than a free diameter (D2) between outer flanks of a thread of the threaded nut.

11. The profile clamp of claim 1, wherein the first threaded section and the second threaded section have a same outside diameter of thread.

12. The profile clamp of claim 11, wherein the first threaded section extends from a first end of the section of reduced diameter towards the screw head, and the second threaded section extends from a second end of the section of reduced diameter towards an end of the screw body.

13. The profile clamp of claim 1, wherein the clamping band is biased to an open position.

14. The profile clamp of claim 1, wherein the threaded nut is secured against rotation with respect to the tensioning head.

15. The profile clamp of claim 1, wherein the section of reduced diameter comprises at least 25% of the length of the screw body.

16. The profile clamp of claim 1, wherein the section of reduced diameter comprises at least 30% of the length of the screw body.

17. The profile clamp of claim 1, wherein the section of reduced diameter comprises at least 40% of the length of the screw body.

18. The profile clamp of claim 1, wherein the section of reduced diameter is formed as a cylinder.

19. The profile clamp of claim 1, wherein the first threaded section comprises a greater length of the screw body than the second threaded section, the first threaded section extends from a first end of the section of reduced diameter towards the screw head, and the second threaded section extends from a second end of the section of reduced diameter towards an end of the screw body.

20. The profile clamp of claim 19, wherein the threaded nut is initially threaded to the second threaded section which comprises a smaller length of the screw body than the first threaded section, the first threaded section extends from a first end of the section of reduced diameter towards the screw head, and the second threaded section extends from a second end of the section of reduced diameter towards an end of the screw body.

* * * * *